(12) United States Patent
Lin (10) Patent No.: US 11,785,560 B2
(45) Date of Patent: Oct. 10, 2023

(54) DATA TRANSMISSION METHOD AND DEVICE, AND SYSTEM

(71) Applicant: GUANGDONG OPPO MOBILE TELECOMMUNICATIONS CORP., LTD., Guangdong (CN)

(72) Inventor: Yanan Lin, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 115 days.

(21) Appl. No.: 17/404,730

(22) Filed: Aug. 17, 2021

(65) Prior Publication Data

US 2021/0377879 A1 Dec. 2, 2021

Related U.S. Application Data

(63) Continuation of application No. 16/898,845, filed on Jun. 11, 2020, now Pat. No. 11,109,327, which is a continuation of application No. PCT/CN2018/072486, filed on Jan. 12, 2018.

(51) Int. Cl.
*H04W 52/42* (2009.01)
*H04W 52/14* (2009.01)
*H04W 52/24* (2009.01)

(52) U.S. Cl.
CPC ........ *H04W 52/42* (2013.01); *H04W 52/146* (2013.01); *H04W 52/24* (2013.01)

(58) Field of Classification Search
CPC ... H04L 5/0007; H04L 5/0064; H04L 5/0073; H04L 5/0091; H04W 52/146; H04W 52/24; H04W 52/242; H04W 52/246; H04W 52/248; H04W 52/281; H04W 52/42; Y02D 30/70

USPC ................. 455/41.1, 411; 370/329
See application file for complete search history.

(56) References Cited

U.S. PATENT DOCUMENTS

| | | | | |
|---|---|---|---|---|
| 9,462,557 | B2 * | 10/2016 | Antó | H04W 52/06 |
| 11,109,327 | B2 * | 8/2021 | Lin | H04W 52/246 |
| 11,553,435 | B2 * | 1/2023 | Hu | H04W 52/54 |
| 2004/0137877 | A1 * | 7/2004 | Crowhurst | G07C 9/00182 |
| | | | | 455/411 |

(Continued)

FOREIGN PATENT DOCUMENTS

| CN | 103491051 A | 1/2014 |
|---|---|---|
| CN | 103650579 A | 3/2014 |

(Continued)

OTHER PUBLICATIONS

3GPP TS 38.213 V15.0.0 (Dec. 2017) (Technical Specification)—3rd Generation Partnership Project; Technical Specification Group Radio Access Network; NR; Physical layer procedures for control (Release 15) (56 pages).

(Continued)

*Primary Examiner* — Tan H Trinh
(74) *Attorney, Agent, or Firm* — PERKINS COIE LLP (57) ABSTRACT

Implementations of the present application relate to the field of communications, and provide a data transmission method and device, and a system. The method comprises: a terminal transmits data using first power in a first area, and transmits data using second power in a second area, wherein the first area and the second area are distinguished by transmission resources.

20 Claims, 3 Drawing Sheets

---

A terminal transmits data at a first power in a first domain — 201

The terminal transmits data at a second power in a second domain, where the first domain and the second domain are distinguished through a transmission resource — 202

(56) References Cited

U.S. PATENT DOCUMENTS

| | | | |
|---|---|---|---|
| 2010/0189093 | A1 | 7/2010 | Palanki et al. |
| 2012/0009869 | A1* | 1/2012 | Suzuki .................. H04B 5/0081 455/41.1 |
| 2013/0250875 | A1* | 9/2013 | Chen ................... H04W 52/365 370/329 |
| 2015/0124720 | A1* | 5/2015 | Morimoto ................ H04L 5/00 370/329 |
| 2015/0146658 | A1 | 5/2015 | Liu et al. |
| 2016/0100414 | A1* | 4/2016 | Guvenkaya ............ H04J 11/003 370/329 |
| 2016/0165547 | A1 | 6/2016 | Ouchi et al. |
| 2016/0330011 | A1 | 11/2016 | Lee et al. |
| 2016/0373064 | A1* | 12/2016 | Lin ......................... H04W 4/80 |
| 2017/0238292 | A1 | 8/2017 | Rico Alvarino et al. |
| 2018/0092018 | A1* | 3/2018 | Jung ................. H04W 52/0209 |
| 2019/0104416 | A1 | 4/2019 | Yerramalli et al. |
| 2019/0132845 | A1 | 5/2019 | Babaei et al. |
| 2019/0141546 | A1 | 5/2019 | Zhou et al. |
| 2019/0149305 | A1 | 5/2019 | Zhou et al. |
| 2019/0207662 | A1 | 7/2019 | Zhou et al. |
| 2019/0207737 | A1 | 7/2019 | Babaei et al. |
| 2019/0215781 | A1 | 7/2019 | Jeon et al. |
| 2019/0215888 | A1 | 7/2019 | Cirik et al. |
| 2019/0229783 | A1* | 7/2019 | Liang ................... H04B 7/0465 |
| 2019/0289513 | A1 | 9/2019 | Jeon et al. |
| 2019/0313343 | A1 | 10/2019 | Molavianjazi et al. |
| 2020/0008155 | A1 | 1/2020 | Li et al. |
| 2020/0196343 | A1 | 6/2020 | Marinier et al. |
| 2020/0228287 | A1 | 7/2020 | Lou et al. |
| 2020/0275391 | A1 | 8/2020 | Guo et al. |
| 2020/0288412 | A1 | 9/2020 | Ajdakple et al. |
| 2020/0288441 | A1* | 9/2020 | Park ...................... H04L 5/0091 |
| 2020/0351798 | A1 | 11/2020 | Ji et al. |
| 2020/0396698 | A1* | 12/2020 | Bala .................... H04W 52/346 |

FOREIGN PATENT DOCUMENTS

| | | |
|---|---|---|
| CN | 104602350 A | 5/2015 |
| CN | 106063178 A | 10/2016 |
| CN | 106375930 A | 2/2017 |
| CN | 106937381 A | 7/2017 |
| CN | 109803361 A | 5/2019 |
| EP | 3267710 A1 | 1/2018 |
| EP | 3691343 A1 | 8/2020 |
| KR | 20160023886 A | 3/2016 |
| WO | 2014163163 A1 | 10/2014 |
| WO | 2017012587 A1 | 1/2017 |
| WO | 2017173920 A1 | 10/2017 |
| WO | 2017193395 A1 | 11/2017 |
| WO | 2018008459 A1 | 1/2018 |

OTHER PUBLICATIONS

3GPP TS 38.331 V15.0.0 (Dec. 2017) (Technical Specification)—3rd Generation Partnership Project; Technical Specification Group Radio Access Network; NR; Radio Resource Control (RRC) protocol specification (Release 15) (99 pages).
Australian First Office Action dated Dec. 4, 2020 of Australian Application No. 2018401508 (4 pages).
International Search Report dated Jul. 30, 2018 of PCT/CN2018/072486 (5 pages).
Non-Final Office Action dated Aug. 26, 2020 of U.S. Appl. No. 16/898,845, filed Jun. 11, 2020.
Non-Final Office Action dated Jan. 28, 2021 of U.S. Appl. No. 16/898,845, filed Jun. 11, 2020.
Notice of Allowance dated May 6, 2021 of U.S. Appl. No. 16/898,845, filed Jun. 11, 2020.
Supplementary European Search Report dated Oct. 20, 2020 of European Patent Application No. 18899473.5 (9 pages).
Examination Report dated May 21, 2021 of European Patent Application No. 18 899 473.5 (8 pages).
Office Action for Taiwanese Application No. 108101246 dated Jul. 7, 2022. 41 pages with English translation.
First Office Action for Chinese Application No. 202010540189.9 dated Oct. 27, 2022. 15 pages with English translation.
Notice of Final Rejection for Korean Application No. 10-2020-7022492 dated Oct. 14, 2022. 6 pages with English translation.
Examination Report for Indian Application No. 202027033524 dated Sep. 6, 2021. 8 pages with English translation.
Huawei et al. "Remaining issues on the PRACH for SUL" R1-1717901; 3GPP TSG RAN WG1 Meeting 90bis; Oct. 9-13, 2017. 5 pages.
Notice of Reasons for Refusal for Japanese Application No. 2020-537712 dated Aug. 27, 2021. 8 pages with English translation.
Notification of Reason for Refusal for Korean Application No. 10-2020-7022492 dated Oct. 21, 2021. 11 pages with English translation.
Vivo "Remaining issues on NR UL power control" R1-1719779; 3GPP TSG RAN WG1 Meeting #91; Nov. 27, Dec. 1, 2017. 4 pages.
Examiner's Report for Indian Application No. 202027033524 dated Mar. 10, 2022. 2 pages.
Extended European Search Report for European Application No. 22158911.2 dated May 23, 2022. 9 pages.
Hearing Notice for Indian Application No. 202027033524 dated Apr. 6, 2022. 2 pages with English translation.
Huawei et al. "General considerations on UL power control design" R1-1712234; 3GPP TSG RAN WG1 Meeting #90; Prague, Czech Republic, Aug. 21-25, 2017. 8 pages.
Intel Corporation "Bandwidth parts configuration and operations" R1-1707420; 3GPP TSG RAN WG1 Meeting #89; Hangzhou, China; May 15-19, 2017. 5 pages.
Notice of Reasons for Refusal for Japanese Application No. 2020-537712 dated Apr. 19, 2022. 4 pages with English translation.
Notification of Reason for Refusal for Korean Application No. 10-2020-7022492 dated Apr. 15, 2022. 9 pages with English translation.
Request for Submission of an Opinion for Korean Application No. 10-2020-7022492 dated Feb. 3, 2023. 13 pages with English translation.
Samsung "Activation/deactivation of bandwidth parts in NR" R2-1711189; 3GPP TSG-RAN WG2 BR #99bis Meeting; Prague, Czech, Oct. 9-13, 2017. 5 pages.

* cited by examiner

DATA TRANSMISSION METHOD AND DEVICE, AND SYSTEM

CROSS-REFERENCE TO RELATED APPLICATION(S)

This application is a continuation application of U.S. application Ser. No. 16/898,845 filed on Jun. 11, 2020, which is a continuation application of International Application No. PCT/CN2018/072486 filed on Jan. 12, 2018, and the entire disclosure of both applications is hereby incorporated by reference.

TECHNICAL FIELD

Implementations of this application relate to the field of communications, and in particular to, a data transmission method, apparatus and system.

RELATED ART

The 5th generation (5G) technology has introduced ultra reliable low latency communication (URLLC).

When transmitting downlink service data, a base station transmits URLLC data in a resource preemption manner. That is, when URLLC data needs to be transmitted at present, the base station transmits the URLLC data by occupying some resources of an enhanced mobile broadband (eMBB) service, thereby reducing the latency of a URLLC service.

However, for an uplink process, uplink service data is transmitted by a terminal, and additional signaling overheads are required when the base station makes real-time adjustment. As a result, the terminal needs to frequently detect a delivered control signal which increases the power consumption of the terminal.

SUMMARY

Implementations of this application provide a data transmission method, apparatus and system.

According to a first aspect of this application, a data transmission method is provided, where the method includes:
  transmitting data by a terminal at a first power in a first domain; and
  transmitting data by the terminal at a second power in a second domain,
  where the first domain and the second domain are distinguished through a transmission resource.

According to a second aspect of this application, a data transmission method is provided, where the method includes:
  receiving data transmitted by a terminal at a first power by an access network device in a first domain; and
  receiving data transmitted by the terminal at a second power by the access network device in a second domain,
  where the first domain and the second domain are distinguished through a transmission resource.

According to a third aspect of this application, a data transmission apparatus is provided, where the apparatus includes:
  a first transmission module, configured to transmit data at a first power in a first domain; and
  a second transmission module, configured to transmit data at a second power in a second domain,
  where the first domain and the second domain are distinguished through a transmission resource.

According to a fourth aspect of this application, a data transmission apparatus is provided, where the apparatus includes:
  a first receiving module, configured to receive data transmitted by a terminal at a first power in a first domain; and
  a second receiving module, configured to receive data transmitted by the terminal at a second power in a second domain,
  where the first domain and the second domain are distinguished through a transmission resource.

According to a fifth aspect of this application, a terminal is provided, where the terminal includes a processor and a memory, the memory stores at least one instruction, and the at least one instruction is executed by the processor to implement the data transmission method according to the foregoing first aspect.

According to a sixth aspect of this application, an access network device is provided, where the access network device includes a processor and a memory, the memory stores at least one instruction, and the at least one instruction is executed by the processor to implement the data transmission method according to the foregoing second aspect.

According to a seventh aspect of this application, a computer readable storage medium is provided, where the storage medium stores at least one instruction, and the at least one instruction is executed by a processor to implement the data transmission method according to the foregoing first aspect.

According to an eighth aspect of this application, a computer readable storage medium is provided, where the storage medium stores at least one instruction, and the at least one instruction is executed by a processor to implement the data transmission method according to the foregoing second aspect.

According to a ninth aspect of this application, a communications system is provided, where the system includes: a terminal and an access network device; the terminal is the terminal according to the fifth aspect; and the access network device is the access network device according to the sixth aspect.

BRIEF DESCRIPTION OF THE DRAWINGS

To describe the technical solutions in the implementations of this application more clearly, the following briefly describes the accompanying drawings required for describing the implementations of this application. Apparently, the accompanying drawings in the following descriptions show merely some implementations of this application, and a person of ordinary skill in the art may still derive other drawings from these accompanying drawings without creative efforts.

DETAILED DESCRIPTION

To make the objectives, technical solutions, and advantages of this application clearer, the following further describes the implementations of this application in detail with reference to the accompanying drawings.

The "module" mentioned in this application usually refers to a program or an instruction stored in a memory that can implement some functions; the "unit" mentioned in this application usually refers to a functional structure that is divided logically, and the "unit" is implemented by pure hardware, or, by a combination of hardware and software.

The "plurality of" mentioned in this application refers to two or more. "and/or", describing the association relationship of associated objects, representing that there are three relationships, for example, A and/or B, can represent: A exists alone, A and B exist simultaneously, and B exits alone. The character "/" usually represents that the associated objects before and after the character is an "or" relationship. The "first", "second" and similar terms used in the specification and claims of this application do not represent any order, quantity or importance, but merely distinguish the different components.

Figure 1:
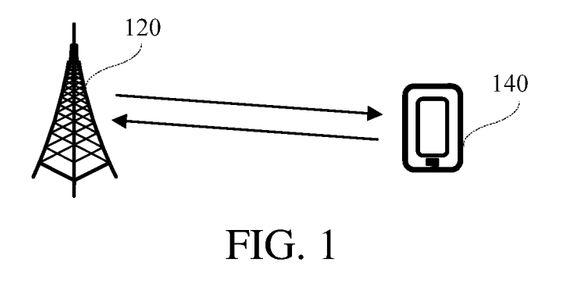
FIG. 1 is a schematic structural diagram of a communications network according to a schematic implementation of this application.

Referring to FIG. 1, FIG. 1 is a schematic structural diagram of a mobile communications system according to an implementation of this application. The mobile communications system can be a 5G system, also known as an NR system. The mobile communications system includes: an access network device 120 and a terminal 140.

The access network device 120 can be a base station. For example, the base station can be a gNB adopting a central distributed architecture in the 5G system. When adopting the central distributed architecture, the access network device 120 usually includes a central unit (CU) and at least two distributed units (DU). A protocol stack of a packet data convergence protocol (PDCP) layer, a radio link control (RLC) layer, and a media access control (MAC) layer is set in the central unit; a protocol stack of a physical (PHY) layer is set in the distributed unit, and the implementations of this application do not limit the specific implementations of the access network device 120. Optionally, the access network device further includes a home eNB (HeNB), a relay, a pico base station Pico, and the like. The access network device 120 is further known as a network side device.

The access network device 120 can establish a wireless connection with the terminal 140 through a wireless air interface. Optionally, the wireless air interface is a wireless air interface based on a fifth generation mobile communications network technology (5G) standard. For example, the wireless air interface is a new radio (NR) air interface; or, the wireless air interface is a wireless air interface based on the next generation mobile communications network technology standard of 5G.

The terminal 140 refers to a device that provides voice and/or data connectivity for a user. The terminal can communicate with one or more core networks through a radio access network (RAN), and the terminal 140 can be a mobile terminal, for example, a mobile phone (which is also known as a "cellular" phone) and a computer with a mobile terminal.

It should be noted that, in the mobile communications system shown in FIG. 1, a plurality of access network devices 120 and/or a plurality of terminals 140 can be included, an access network device 120 and a terminal 140 are shown in FIG. 1 as an example, but this implementation does not limit this.

Figure 2:
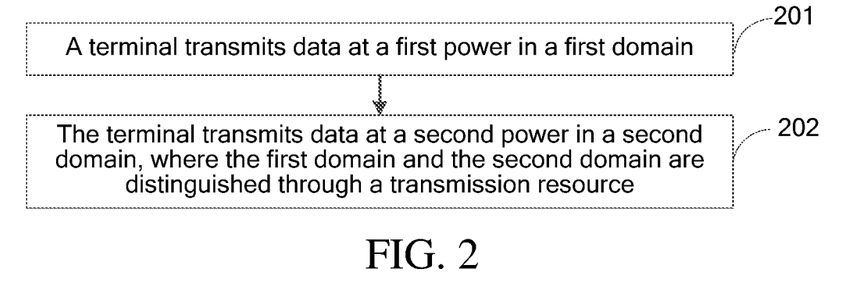
FIG. 2 is a flowchart of a data transmission method according to a schematic implementation of this application.

Referring to FIG. 2, FIG. 2 is a flowchart of a data transmission method according to an exemplary implementation of this application. This implementation is illustrated by using an example in which the method is applied to the terminal in FIG. 1. The method includes:

Step 201. The terminal transmits data at a first power in a first domain.

Step 202. The terminal transmits data at a second power in a second domain, where the first domain and the second domain are distinguished through a transmission resource.

Optionally, the first domain and the second domain are logical domains obtained by an access network device by dividing the transmission resource, where the transmission resource includes a time domain resource and/or a frequency domain resource.

In a possible implementation, the first domain and the second domain are distinguished by using any one of the following manners.

1. The first domain and the second domain are distinguished through the time domain resource.

Optionally, the access network device distinguishes domains based on the time domain resource, where the time domain resource includes at least one of a symbol, a slot, and a subframe.

Optionally, the first domain and the second domain occupy a same quantity of or different quantities of time domain resources.

For example, the access network device distinguishes the domains according to slots, a first slot in the subframe can be allocated as the first domain, and a second slot in the subframe can be allocated as the second domain.

Certainly, the domains can be further distinguished based on other types of time domain resources, and this implementation does not limit this.

2. The first domain and the second domain are distinguished through the frequency domain resource.

Optionally, the access network device distinguishes the domains based on the frequency domain resource, where the frequency domain resource includes at least one of a physical resource block (PRB) and a resource block group (RBG).

Optionally, the first domain and the second domain occupy a same quantity of or different quantities of frequency domain resources.

For example, when the access network device distinguishes the domains according to the physical resource block, the first to the fiftieth physical resource blocks can be allocated as the first domain, and the fifty-first to the hundredth physical resource blocks can be allocated as the second domain.

Certainly, the domains can be further configured based on other types of frequency domain resources, and this implementation does not limit this.

3. The first domain and the second domain are distinguished through the time domain resource and the frequency domain resource.

Optionally, in addition to distinguishing the domains based on the frequency domain resource or the time domain resource alone, the access network device can further distinguish the domains based on both the time domain resource and the frequency domain resource.

Optionally, the access network device configures the first domain and the second domain based on both the slot and the physical resource block.

4. The first domain and the second domain are distinguished through a frequency domain bandwidth part (BWP).

The BWP refers to a group of continuous physical resource blocks on a given parameter set and a given carrier.

In a possible implementation, the access network device can configure at least two BWPs for the terminal on an available bandwidth, and the at least two BWPs correspond to different domains respectively. For example, in this implementation, the access network device configures a BWP 1 and a BWP 2 for the terminal, and the BWP 1 and the BWP 2 correspond to the first domain and the second domain respectively.

Optionally, when two BWPs are configured, the two BWPs correspond to different time domain resources and different frequency domain resources. For example, the BWP 1 corresponds to a PRB 1 to a PRB 50, and the BWP 2 corresponds to a PRB 51 to a PRB 55; or, the two BWPs correspond to a same time domain resource and a same frequency domain resource, but correspond to different subcarrier spacings. For example, the BWP 1 and the BWP 2 both correspond to a PRB 51 to a PRB 55. However, the subcarrier spacing corresponding to the BWP 1 is 60 KHz, and the subcarrier spacing corresponding to the BWP 2 is 15 KHz.

Optionally, in this implementation of this application, description is made by using an example in which only two domains are configured, and at least three domains can be configured in other possible implementations. This application does not limit the specific quantity of domains.

Optionally, the access network device transmits, to the terminal, domain configuration information indicating configurations of the first domain and the second domain, so that the terminal determines the first domain and the second domain according to the domain configuration information.

Optionally, the domain configuration information transmitted by the access network device is further used to indicate a distinguishing manner and configuration information of the first domain and the second domain. For example, when different domains are configured through the BWP, the domain configuration information includes configuration information such as a BWP subcarrier spacing.

Optionally, power parameters of the first power and the second power are configured by the access network device, where the power parameters can be represented in an actual power value or a power spectral density (PSD).

In a possible application scenario, under scheduling of the access network device, the terminal transmits service data at low power in the first domain, or, transmits the service data at high power in the second domain; when the terminal transmits high-priority service data under the scheduling of the access network device, in order to reduce a transmission latency of the high-priority service data, the terminal chooses to transmit the high-priority service data in the first domain in a resource preemption manner, and in order to ensure the reliability of the transmission, the high-priority service data is transmitted at the high power. The low power and the high power can be agreed in a protocol, or can be indicated by the access network device.

Optionally, in an actual application scenario, when the foregoing method is applied to a scenario of transmitting uplink data of an eMBB service and a URLLC service in 5G, under the scheduling of the access network device, the terminal transmits eMBB service data at the first power (that is, the low power) in the first domain, and transmits the eMBB service data at the second power (that is, normal power) in the second domain; when the terminal transmits URLLC service data under the scheduling of the access network device, in order to reduce a transmission latency of the URLLC service data, the terminal chooses to transmit the URLLC service data in the first domain by preempting a resource of the eMBB service, and in order to ensure the high reliability of the URLLC service, the terminal transmits the URLLC service data at third power (greater than the first power, and the same as or different from the second power) in the first domain.

In conclusion, in this implementation, by configuring different domains on the transmission resource, the terminal is enabled to transmit data at corresponding power in different domains, to prevent the terminal from frequently detecting a control signal in a process of transmitting the uplink data, thereby reducing the power consumption of the terminal. In addition, transmitting data at different power helps improve the reliability and efficiency of data transmission between the terminal and the access network device in the communications system.

Figure 3:
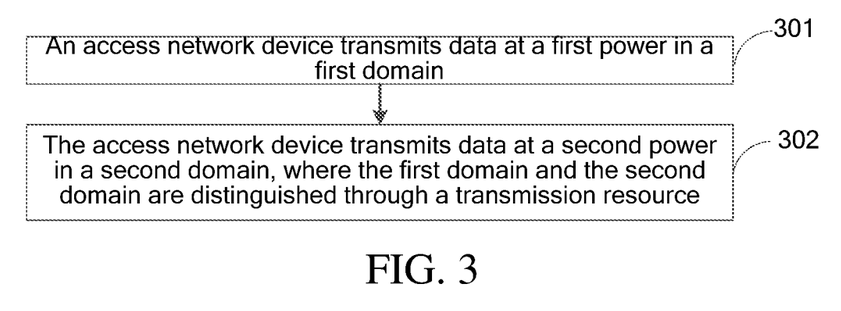
FIG. 3 is a flowchart of a data transmission method according to a schematic implementation of this application.

Referring to FIG. 3, FIG. 3 is a flowchart of a data transmission method according to an exemplary implementation of this application. This implementation is illustrated by using an example in which the method is applied to the access network device in FIG. 1. The method includes:

Step 301. The access network device transmits data at a first power in a first domain.

The access network device distinguishes the first domain and a second domain (logical domains) through a transmission resource, where the transmission resource includes a time domain resource and/or a frequency domain resource.

Optionally, manners in which the access network device distinguishes domains include the following:
1. The first domain and the second domain are distinguished through a time domain resource.
2. The first domain and the second domain are distinguished through a frequency domain resource.
3. The first domain and the second domain are distinguished through the time domain resource and the frequency domain resource.
4. The first domain and the second domain are distinguished through a frequency domain bandwidth part (BWP).

Specific distinguishing manners are described in detail in step 202, and details are not described in this implementation again.

Step 302. The access network device transmits data at a second power in the second domain, where the first domain and the second domain are distinguished through the transmission resource.

According to the distinguished domains, the access network device transmits downlink data at corresponding power in corresponding domains.

In a possible implementation, the access network device transmits data at low power in the first domain and transmits data at high power in the second domain.

Optionally, in an actual application scenario, when the foregoing method is applied to a scenario of transmitting downlink data of an eMBB service and a URLLC service in 5G, the access network device transmits eMBB service data at the first power (which is, for example, the low power) in the first domain, and transmits the eMBB service data at the second power (which is, for example, normal power, and is higher than the first power) in the second domain;

Optionally, when the access network device needs to schedule the URLLC service, in order to reduce a transmission latency of URLLC service data, the access network device chooses to transmit the URLLC service data in the first domain by preempting a resource of the eMBB service, and in order to ensure high reliability of the URLLC service, the access network device transmits the URLLC service data at third power (greater than the first power, and the same as or different from the second power) in the first domain.

Optionally, in order to instruct a terminal to transmit uplink data in the similar manner, the access network device transmits domain configuration information to the terminal based on a domain configuration, where the access network device can transmit the domain configuration information in a broadcast manner.

In order to enable the terminal to transmit the uplink data at corresponding power in different domains, the access network device further indicates, to the terminal, power at which data is transmitted in different domains. Optionally, the access network device transmits, to the terminal, a difference between a power parameter of the first power and a power parameter of the second power, or, the access network device independently configures part of all of the power parameters of the first power and the second power.

Furthermore, under scheduling of the access network device, the terminal transmits data at the first power in the first domain, and transmits data at the second power in the second domain, and correspondingly, the access network device receives, in the first domain and/or the second domain, the data transmitted by the terminal.

As for the received data, optionally, the access network device distinguishes the received data based on a length of a transmission time interval (TTI), a control resource set (COREST), or a physical downlink control channel format (PDCCH Format). For example, the access network device distinguishes eMBB data and URLLC data according to the length of the TTI. This implementation does not limit the manner in which the access network device distinguishes data types.

In conclusion, in this implementation, by configuring different domains on the transmission resource, the terminal is enabled to transmit data at corresponding power in different domains, to prevent the terminal from frequently detecting a control signal in a process of transmitting the uplink data, thereby reducing the power consumption of the terminal. In addition, transmitting data at different power helps improve the reliability and efficiency of data transmission between the terminal and the access network device in the communications system.

Figure 4:
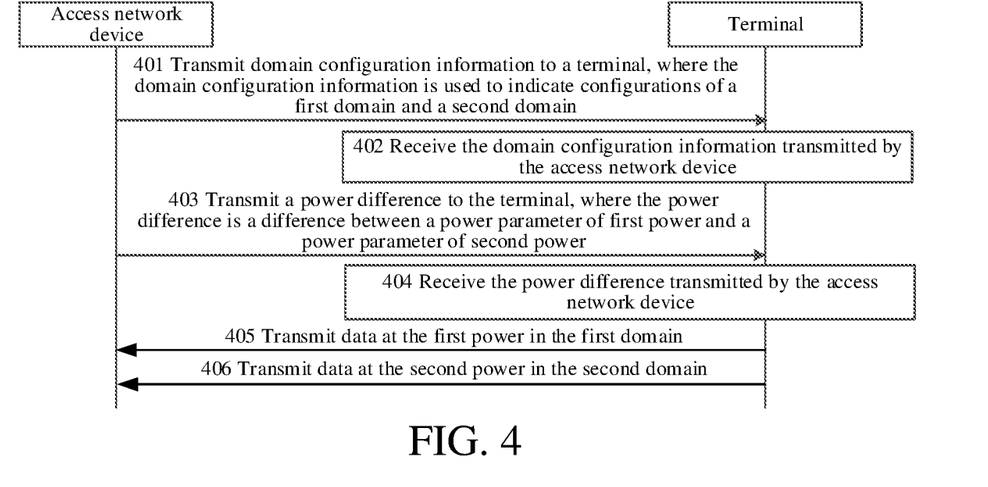
FIG. 4 is a flowchart of a data transmission method according to another schematic implementation of this application.

Referring to FIG. 4, FIG. 4 is a flowchart of a data transmission method according to another exemplary implementation of this application. This implementation is illustrated by using an example in which the method is applied to the communications system in FIG. 1. The method includes:

Step 401. An access network device transmits domain configuration information to a terminal, where the domain configuration information is used to indicate configurations of a first domain and a second domain.

Optionally, the domain configuration information includes: time domain configuration information, frequency domain configuration information, or time and frequency domain configuration information.

Optionally, the access network device transmits the domain configuration information to each terminal in a broadcast manner, so that each accessed terminal knows a configuration of a domain.

In a possible implementation, when different domains are configured based on a physical resource block, the domain configuration information transmitted by the access network device to the terminal can adopt the following format: Power_parameter (n_PRB)={0, 1}, where the n_PRB is used to indicate the $n^{th}$ physical resource block, the 0 represents that the physical resource block belongs to the first domain, and the 1 represents that the physical resource block belongs to the second domain.

Similarly, when different domains are configured based on a slot, the domain configuration information transmitted by the access network device to the terminal can adopt the following format: Power_parameter (n_slot)={0, 1}, where the n_slot is used to indicate the $n^{th}$ slot, the 0 represents that the slot belongs to the first domain, and the 1 represents that the slot belongs to the second domain.

In order to reduce the interference between cells and improve the data transmission quality, in a possible implementation, domain configuration information can be exchanged between access network devices, so that an access network device can adjust its own domain configuration according to domain configuration information of an adjacent access network device, and transmits the adjusted domain configuration information to the terminal. For example, domain configuration information A transmitted by an access network device A to an access network device B is: Power_parameter (PRB1)={0} and Power_parameter (PRB2)={1}, that is, the access network device A allocates a first physical resource block to the first domain, allocates a second physical resource block to the second domain, and the access network device B adjusts its own domain configuration information B to Power_parameter (PRB1)={1} and Power_parameter (PRB2)={0}.

Step 402. The terminal receives the domain configuration information transmitted by the access network device.

Step 403. The access network device transmits a power difference to the terminal, where the power difference is a difference between a power parameter of first power and a power parameter of second power.

In order to reduce the interference between data transmission in the first domain and data transmission in the second domain, the terminal needs to transmit data at different power in different domains. Correspondingly, when indicating the domain configuration, the access network device further needs to indicate, to the terminal, transmission power of data in different domains.

Optionally, the access network device transmits the power difference between the first domain and the second domain to the terminal. The power parameter can be represented in an actual power value or a power spectral density.

Optionally, the access network device further transmits a configured power parameter to the terminal, so that the terminal determines the first power and the second power based on the power parameter and the power difference. The power parameters transmitted by the access network device includes at least one of a target received power parameter, a path loss compensation coefficient, and a dynamic power adjustment value.

Optionally, for the power parameters, the following configuration manners are included:

1. The path loss compensation coefficient in the power parameters is configured independently, and the target received power parameter and the dynamic power adjustment value in the power parameters are configured in common.

When this configuration manner is adopted, the access network device configures respective path loss compensation coefficients for domains, and configures a uniform target received power parameter and dynamic power adjustment value for the domains, that is, different domains have different path loss compensation coefficients, but have a same target received power parameter and dynamic power adjustment value.

2. The path loss compensation coefficient and the dynamic power adjustment value in the power parameters are configured independently, and the target received power parameter in the power parameters is configured in common.

When this configuration manner is adopted, the access network device configures respective path loss compensation coefficients and dynamic power adjustment values for domains, and configures a uniform target received power parameter for the domains, that is, different domains have different path loss compensation coefficients and dynamic power adjustment values, but have a same target received power parameter.

3. The dynamic power adjustment value in the power parameters is configured independently, and the target received power parameter and the path loss compensation coefficient in the power parameters are configured in common.

When this configuration manner is adopted, the access network device configures respective dynamic power adjustment values for domains, and configures a uniform target received power parameter and path loss compensation coefficient for the domains, that is, different domains have different dynamic power adjustment values, but have a same target received power parameter and path loss compensation coefficient.

When the power parameter is configured in the foregoing three manners, distinguishable power control can be performed for different scenarios, services, and data types, and signaling overheads generated when configuring the power parameter can be further reduced (due to existence of a shared configuration).

4. The dynamic power adjustment value, the target received power parameter, and the path loss compensation coefficient in the power parameters are configured in common.

When this configuration manner is adopted, the access network device configures a uniform target received power parameter, path loss compensation coefficient and dynamic power adjustment value for domains, that is, different domains have a same target received power parameter, path loss compensation coefficient, and dynamic power adjustment value.

When the power parameter is configured in this manner, the signaling overheads generated when configuring the power parameter are reduced to a minimum value because a configuration parameter is shared by different domains. In the subsequent process, the terminal performs the distinguishable power control for different scenarios, services, and data types according to the power difference configured by the access network device.

5. The target received power parameter and the path loss compensation coefficient in the power parameters are configured independently, and the dynamic power adjustment value in the power parameters is configured in common.

When this configuration manner is adopted, the access network device configures respective target received power parameters and path loss compensation coefficients for domains, and shares the dynamic power adjustment value for the domains, that is, different domains have different target received power parameters and path loss compensation coefficients, but have a same dynamic power adjustment value.

When this configuration manner is adopted, the distinguishable power control can be performed for different scenarios, services, and data types, and moreover, a variation of a channel can be traced in real time according to a shared dynamic power adjustment value.

6. The target received power parameter, the path loss compensation coefficient, and the dynamic power adjustment value in the power parameters are configured independently.

When this configuration manner is adopted, the access network device configures respective target received power parameters, path loss compensation coefficients, and dynamic power adjustment values for domains, that is, different domains have different target received power parameters, different path loss compensation coefficients, and different dynamic power adjustment values.

When this configuration manner is adopted, more accurate distinguishable power control can be performed for different scenarios, services, and data types because respective power parameters are set for the domains (however, the signaling overheads are increased correspondingly).

7. The target received power parameter in the power parameters is configured independently, and the path loss compensation coefficient and the dynamic power adjustment value in the power parameters are configured in common.

When this configuration manner is adopted, the access network device configures respective target received power parameters for domains, and configures a uniform dynamic power adjustment value and path loss compensation coefficient for the domains, that is, different domains have different target received power parameters, but have a same dynamic power adjustment value and different path loss compensation coefficients.

When this configuration manner is adopted, the distinguishable power control can be performed for different scenarios, services, and data types by independently configuring only target received power, and moreover the signaling overheads for configuring the power parameter are reduced.

8. The target received power parameter and the dynamic power adjustment value in the power parameters are configured independently, and the path loss compensation coefficient in the power parameters is configured in common.

When this configuration manner is adopted, the access network device configures respective target received power parameters and dynamic power adjustment values for domains, and configures a uniform path loss compensation coefficient for the domains, that is, different domains have different target received power parameters and different dynamic power adjustment values, but have a same path loss compensation coefficient. Optionally, in order to avoid a case in which the power difference is excessively large and consequently dynamic signaling cannot be traced, the access network device configures the power difference in a semi-static configuration manner. For example, the access network device transmits the power difference to the terminal at a preset time interval, and the terminal stores and uses the currently received power difference before the power difference is transmitted by the access network device next time.

It should be noted that, there is no strict sequence between step 401 and step 403, that is, step 401 and step 403 can be executed simultaneously, and this implementation does not limit the execution time sequence of both.

Step 404. The terminal receives the power difference transmitted by the access network device.

Optionally, the terminal calculates, based on the power parameter configured by the access network device, transmission power expected by the access network device, and determines transmission power of data in different domains according to the expected transmission power and the power difference.

Optionally, based on a transmission power calculating formula agreed in a protocol and according to the power parameter configured by the access network device, the terminal calculates the transmission power expected by the access network device, and details are not described in this implementation again.

In a possible implementation, when the terminal is scheduled to transmit data in the first domain, the terminal is to set the transmission power (the first power) as the expected transmission power minus the power difference.

When the terminal is scheduled to transmit data in the second domain, the terminal is to set the transmission power (the second power) as the transmission power expected by the access network device.

When the terminal is scheduled to transmit high-priority data, the terminal determines to transmit the high-priority data in the first domain, and sets the transmission power to the transmission power expected by the access network device, thereby reducing the interference from other low-priority data in the second domain and improving the reliability of transmitting the high-priority data.

In a schematic example, in a scheduling scenario of an eMBB service and a URLLC service, the transmission power expected by the access network device is P, and the power difference configured by the access network device is delta P. When the terminal is scheduled to transmit eMBB data in the first domain, the transmission power is set as P minus delta P; when the terminal is scheduled to transmit the eMBB data in the second domain, the transmission power is set as P; and when the terminal is scheduled to transmit URLLC data in the first domain, the transmission power is set as P.

Step 405. The terminal transmits data at the first power in the first domain.

With reference to the examples in the foregoing steps, when the terminal is scheduled to transmit the eMMB data in the first domain, the terminal transmits the eMMB data at the transmission power P minus delta P.

Step 406. The terminal transmits data at the second power in the second domain.

With reference to the examples in the foregoing steps, when the terminal is scheduled to transmit the eMMB data in the second domain, the terminal transmits the eMMB data at the transmission power P.

Optionally, when a resource is preempted by the URLLC service, the terminal transmits the URLLC data at third power in the first domain. For example, the third power can be the P in the foregoing examples.

In conclusion, in this implementation, by configuring different domains on the transmission resource, the terminal is enabled to transmit data at corresponding power in different domains, to prevent the terminal from frequently detecting a control signal in a process of transmitting uplink data, thereby reducing the power consumption of the terminal. In addition, transmitting data at different power helps improve the reliability and efficiency of data transmission between the terminal and the access network device in the communications system.

In this implementation, the access network device transmits the domain configuration information and the power difference between different domains to the terminal, so that the terminal determines different domains according to the domain configuration information, and determines the transmission power of data in different domains according to the power difference, so as to perform subsequent uplink data transmission, thereby improving the reliability and efficiency of the uplink data transmission. Moreover, the access network device configures the power difference in a semi-static manner, thereby avoiding the failure to trace a power jump.

In this implementation, the access network devices exchange the domain configuration information with each other and domain adjustment is performed according to the obtained domain configuration information, thereby reducing the interference between adjacent cells and further improving the data transmission quality of the system.

Figure 5:
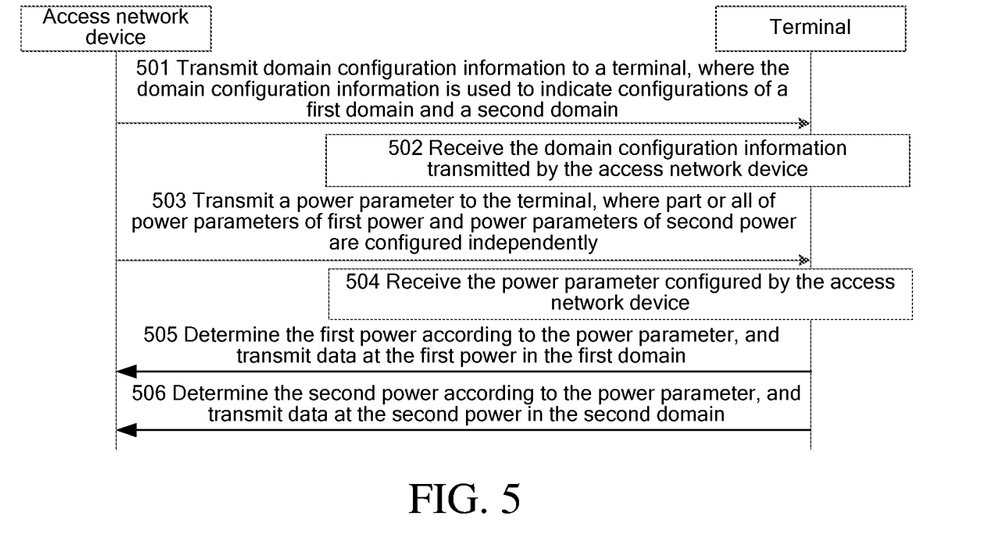
FIG. 5 is a flowchart of a data transmission method according to another schematic implementation of this application.

Referring to FIG. 5, FIG. 5 is a flowchart of a data transmission method according to another exemplary implementation of this application. This implementation is illustrated by using an example in which the method is applied to the communications system in FIG. 1. The method includes:

Step 501. An access network device transmits domain configuration information to a terminal, where the domain configuration information is used to indicate configurations of a first domain and a second domain.

In this implementation, the access network device configures two BWPs for the terminal, and the two BWPs respectively correspond to the first domain and the second domain. When transmitting the domain configuration information to the terminal, the access network device transmits configuration information of the two BWPs and configuration information to the terminal.

Optionally, the two BWPs correspond to different time domain resources and different frequency domain resources. For example, the BWP 1 corresponds to a PRB 1 to a PRB 50, and the BWP 2 corresponds to a PRB 51 to a PRB 55; or, the two BWPs correspond to a same time domain resource and a same frequency domain resource, but correspond to different subcarrier spacings. For example, the BWP 1 and the BWP 2 both correspond to a PRB 51 to a PRB 55. However, the subcarrier spacing corresponding to the BWP 1 is 60 KHz, and the subcarrier spacing corresponding to the BWP 2 is 15 KHz. This implementation does not limit this.

Step 502. The terminal receives the domain configuration information transmitted by the access network device.

Correspondingly, after receiving the domain configuration information, the terminal determines the first domain and the second domain according to the BWP configuration information in the domain configuration information.

Step 503. The access network device transmits a power parameter to the terminal, where part or all of power parameters of first power and power parameters of second power are configured independently.

In this implementation, the access network device independently configures part or all of (uplink) power parameters for each BWP, so that the terminal determines transmission power of data in each domain according to the power parameter configured for the BWP.

Optionally, the power parameters include at least one of a target received power parameter, a path loss compensation coefficient, and a dynamic power adjustment value, where the target received power parameter is power of data that the access network device expects to receive, the path loss compensation coefficient is used to compensate for the power loss in a transmission process, and the dynamic power adjustment value can be indicated in a manner of a value or a set (for example, {−3, 0, 3, 6}).

Optionally, configuration manners of the power parameter include the following:

1. The target received power parameter and the path loss compensation coefficient in the power parameters are configured independently, and the dynamic power adjustment value in the power parameters is configured in common.

When this configuration manner is adopted, the access network device configures respective target received power parameters and path loss compensation coefficients for BWPs, and shares the dynamic power adjustment value for the BWPs, that is, different BWPs have different target received power parameters and different path loss compensation coefficients, but have a same dynamic power adjustment value.

For example, the power parameter transmitted by the access network device includes target received power P1 and a path loss compensation coefficient a1 that are configured for a BWP 1; target received power P2 and a path loss compensation coefficient a2 that are configured for a BWP 2; and a dynamic power adjustment value f1 that is uniformly configured.

When this configuration manner is adopted, distinguishable power control can be performed for different scenarios, services, and data types, and moreover, a variation of a channel can be traced in real time according to a shared dynamic power adjustment value.

2. The target received power parameter, the path loss compensation coefficient, and the dynamic power adjustment value in the power parameters are configured independently.

When this configuration manner is adopted, the access network device configures respective target received power parameters, path loss compensation coefficients, and dynamic power adjustment values for BWPs, that is, different BWPs have different target received power parameters, different path loss compensation coefficients, and different dynamic power adjustment values.

For example, the power parameter transmitted by the access network device includes the target received power P1, the path loss compensation coefficient a1, and the dynamic power adjustment value f1 that are configured for the BWP 1; and the target received P2, the path loss compensation coefficient a2, and a dynamic power adjustment value f2 that are configured for the BWP 2.

When this configuration manner is adopted, more accurate distinguishable power control can be performed for different scenarios, services, and data types because respective power parameters are set for the BWPs (however, signaling overheads are increased).

3. The target received power parameter in the power parameters is configured independently, and the path loss compensation coefficient and the dynamic power adjustment value in the power parameters are configured in common.

When this configuration manner is adopted, the access network device configures respective target received power parameters for BWPs, and configures a uniform dynamic power adjustment value and path loss compensation coefficient for the BWPs, that is, different BWPs have different target received power parameters, but have a same dynamic power adjustment value and different path loss compensation coefficients.

For example, the power parameter transmitted by the access network device includes the target received power P1 that is configured for the BWP 1; the target received power P2 that is configured for the BWP 2; and the dynamic power adjustment value f1 and the path loss compensation coefficient a1 that are uniformly configured.

When this configuration manner is adopted, the distinguishable power control can be performed for different scenarios, services, and data types by independently configuring only target received power, and moreover the signaling overheads for configuring the power parameter are reduced.

4. The target received power parameter and the dynamic power adjustment value in the power parameters are configured independently, and the path loss compensation coefficient in the power parameters is configured in common.

When this configuration manner is adopted, the access network device configures respective target received power parameters and dynamic power adjustment values for BWPs, and configures a uniform path loss compensation coefficient for the BWPs, that is, different BWPs have different target received power parameters and different dynamic power adjustment values, but have a same path loss compensation coefficient.

For example, the power parameter transmitted by the access network device includes the target received power P1 and the dynamic power adjustment value f1 that are configured for the BWP 1; the target received power P2 and the dynamic power adjustment value f2 that are configured for the BWP 2; and the path loss compensation coefficient a1 that is uniformly configured. Step 504. The terminal receives the power parameter configured by the access network device.

5. The path loss compensation coefficient in the power parameters is configured independently, and the target received power parameter and the dynamic power adjustment value in the power parameters are configured in common.

When this configuration manner is adopted, the access network device configures respective path loss compensation coefficients for BWPs, and configures a uniform target received power parameter and dynamic power adjustment value for the BWPs, that is, different BWPs have different path loss compensation coefficients, but have a same target received power parameter and dynamic power adjustment value.

6. The path loss compensation coefficient and the dynamic power adjustment value in the power parameters are configured independently, and the target received power parameter in the power parameters is configured in common.

When this configuration manner is adopted, the access network device configures respective path loss compensation coefficients and dynamic power adjustment values for BWPs, and configures a uniform target received power parameter for the BWPs, that is, different BWPs have different path loss compensation coefficients and dynamic power adjustment values, but have a same target received power parameter.

7. The dynamic power adjustment value in the power parameters is configured independently, and the target received power parameter and the path loss compensation coefficient in the power parameters are configured in common.

When this configuration manner is adopted, the access network device configures respective dynamic power adjustment values for BWPs, and configures a uniform target received power parameter and path loss compensation coefficient for the BWPs, that is, different BWPs have different dynamic power adjustment values, but have a same target received power parameter and path loss compensation coefficient.

When the power parameter is configured in the foregoing three manners, the distinguishable power control can be performed for different scenarios, services, and data types, and the signaling overheads generated when configuring the power parameter can be further reduced (due to existence of a shared configuration).

8. The dynamic power adjustment value, the target received power parameter, and the path loss compensation coefficient in the power parameters are configured in common.

When this configuration manner is adopted, the access network device configures a uniform target received power parameter, path loss compensation coefficient and dynamic power adjustment value for BWPs, that is, different BWPs have a same path loss compensation coefficient, target received power parameter, and dynamic power adjustment value.

When the power parameter is configured in this manner, the signaling overheads generated when configuring the power parameter are reduced to a minimum value because a configuration parameter is shared by different BWPs. In the subsequent process, the terminal performs the distinguishable power control for different scenarios, services, and data types according to the power difference configured by the access network device.

The terminal receives the stores a power parameter configured by the access network device, so that when transmitting uplink data subsequently, the terminal determines the transmission power based on the power parameter.

Step 505. The terminal determines the first power according to the power parameter, and transmits data at the first power in the first domain.

Optionally, the access network device configures relatively small target received power in the power parameters for the BWP 1 (corresponding to the first domain), so that when scheduled to transmit data in the first domain, the terminal sets transmission power (that is, the first power) according to the relatively small target received power in the power parameters, and transmits data according to the set transmission power.

For example, when transmitting (uplink) eMMB data on the BWP 1, the terminal sets the transmission power with reference to the relatively small target received power, thereby transmitting the eMMB data at low power in the first domain.

Step 506. The terminal determines the second power according to the power parameter, and transmits data at the second power in the second domain.

Optionally, the access network device configures relatively large target received power in the power parameters for the BWP 2 (corresponding to the second domain), so that when scheduled to transmit data in the second domain, the terminal sets transmission power (that is, the second power) according to the relatively large target received power in the power parameters, and transmits data according to the set transmission power.

For example, when transmitting the (uplink) eMMB data on the BWP 2, the terminal sets the transmission power with reference to the relatively large target received power, thereby transmitting the eMMB data at high power in the second domain.

Optionally, when URLLC data needs to be transmitted, the terminal transmits the URLLC data by using a resource of the BWP 1 (corresponding to the first domain) in a resource preemption manner, and configures relatively large transmission power (for example, based on the relatively large target received power) for the URLLC data, thereby improving the reliability of transmitting the URLLC data.

In conclusion, in this implementation, by configuring different domains on the transmission resource, the terminal is enabled to transmit data at corresponding power in different domains, to prevent the terminal from frequently detecting a control signal in a process of transmitting the uplink data, thereby reducing the power consumption of the terminal. In addition, transmitting data at different power helps improve the reliability and efficiency of data transmission between the terminal and the access network device in the communications system.

In addition, in a 5G system, reliability requirements of a URLLC service and an eMBB service are different, and service types cannot be seen at a physical layer. Therefore, power control based on the service types becomes a problem to be resolved. In this implementation of this application, at least two BWPs are configured, and the URLLC data is transmitted at the high power on only one of the BWPs, to implement the distinguishable power control based on the service types, and help improve the reliability of transmitting the URLLC data; moreover, the power consumption of transmission and the interference to the system can be reduced by enhancing the power of only the URLLC data.

The following describes apparatus implementations. The apparatus implementations correspond to the method implementations. Therefore, for technical details that are not described in the apparatus implementations, refer to corresponding descriptions in the foregoing method implementations.

Figure 6:
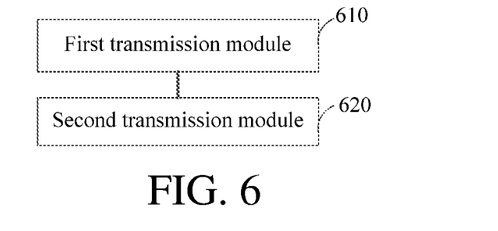
FIG. 6 is a block diagram of a data transmission apparatus according to an exemplary implementation of this application.

Referring to FIG. 6, FIG. 6 is a block diagram of a data transmission apparatus according to an exemplary implementation of this application. The data transmission apparatus can be implemented as all or part of a terminal through software, hardware, or a combination of the software and the hardware. The apparatus includes:

a first transmission module 610, configured to transmit data at a first power in a first domain; and a second transmission module 620, configured to transmit data at a second power in a second domain, where the first domain and the second domain are distinguished through a transmission resource.

Optionally, the first domain and the second domain are distinguished through a time domain resource; or,
the first domain and the second domain are distinguished through a frequency domain resource; or,
the first domain and the second domain are distinguished through the time domain resource and the frequency domain resource; or,
the first domain and the second domain are distinguished through a frequency domain bandwidth part BWP,
where the time domain resource includes at least one of a symbol, a slot, and a subframe, and the frequency domain resource includes at least one of a physical resource block PRB and a resource block group RBG.

Optionally, the apparatus further includes:
an information receiving module, configured to receive domain configuration information transmitted by an access network device, where the domain configuration information is used to indicate configurations of the first domain and the second domain.

Optionally, the apparatus further includes:
an information receiving module, configured to receive domain configuration information transmitted by an access network device, where the domain configuration information is used to indicate configurations of the domain working under the first power and the domain working under the second power; and
a difference receiving module, configured to receive a power difference transmitted by the access network device,
where the power difference is a difference between a power parameter of the first power and a power parameter of the second power.

Optionally, the power difference is configured in a semi-static manner.

Optionally, part or all of the power parameters of the first power and the power parameters of the second power are configured independently.

Optionally, a target received power parameter and a path loss compensation coefficient in the power parameters are configured independently, and a dynamic power adjustment value in the power parameters is configured in common.
or,
the target received power parameter, the path loss compensation coefficient, and the dynamic power adjustment value in the power parameters are configured independently;
or,
the target received power parameter in the power parameters is configured independently, and the path loss compensation coefficient and the dynamic power adjustment value in the power parameters are configured in common;
or,
the target received power parameter and the dynamic power adjustment value in the power parameter are configured independently, and the path loss compensation coefficient in the power parameters is configured in common;
or,
the path loss compensation coefficient in the power parameter is configured independently, and the target received power parameter and the dynamic power adjustment value in the power parameters are configured in common;
or,
the path loss compensation coefficient and the dynamic power adjustment value in the power parameters are configured independently, and the target received power parameter in the power parameters is configured in common;
or,
the dynamic power adjustment value in the power parameters is configured independently, and the target received power parameter and the path loss compensation coefficient in the power parameters are configured in common;
or,
the dynamic power adjustment value, the target received power parameter, and the path loss compensation coefficient in the power parameters are configured in common.

For related details, refer to the steps performed by the terminal in each of the foregoing method implementations.

Figure 7:
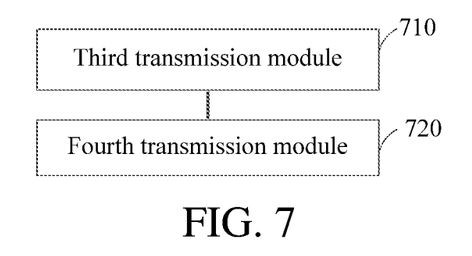
FIG. 7 is a block diagram of a data transmission apparatus according to an exemplary implementation of this application.

Referring to FIG. 7, FIG. 7 is a block diagram of a data transmission apparatus according to an exemplary implementation of this application. The data transmission apparatus can be implemented as all or part of an access network device through software, hardware, or a combination of the software and the hardware. The apparatus includes:
a third transmission module 710, configured to transmit data at a first power in a first domain; and
a fourth transmission module 720, configured to transmit data at a second power in a second domain,
where the first domain and the second domain are distinguished through a transmission resource.

Optionally, the first domain and the second domain are distinguished through a time domain resource; or,
the first domain and the second domain are distinguished through a frequency domain resource; or,
the first domain and the second domain are distinguished through the time domain resource and the frequency domain resource; or,
the first domain and the second domain are distinguished through a frequency domain bandwidth part BWP,
where the time domain resource includes at least one of a symbol, a slot, and a subframe, and the frequency domain resource includes at least one of a physical resource block PRB and a resource block group RBG.

Optionally, the apparatus further includes:
an information transmission module, configured to transmit domain configuration information to a terminal, where the domain configuration information is used to indicate configurations of the first domain and the second domain.

Optionally, the apparatus further includes:
an information transmission module, configured to transmit domain configuration information to a terminal, where the domain configuration information is used to indicate configurations of the first domain and the second domain; and
a difference transmission module, configured to transmit a power difference to the terminal,
where the power difference is a difference between a power parameter of the first power and a power parameter of the second power.

Optionally, the power difference is configured in a semi-static manner.

Optionally, part or all of the power parameters of the first power and the power parameters of the second power are configured independently.

Optionally,
a target received power parameter and a path loss compensation coefficient in the power parameters are configured independently, and a dynamic power adjustment value in the power parameter is configured in common.

or, the target received power parameter, the path loss compensation coefficient, and the dynamic power adjustment value in the power parameters are configured independently;

or, the target received power parameter in the power parameters is configured independently, and the path loss compensation coefficient and the dynamic power adjustment value in the power parameters are configured in common;

or, the target received power parameter and the dynamic power adjustment value in the power parameters are configured independently, and the path loss compensation coefficient in the power parameters is configured in common;

or, the path loss compensation coefficient in the power parameters is configured independently, and the target received power parameter and the dynamic power adjustment value in the power parameters are configured in common;

or, the path loss compensation coefficient and the dynamic power adjustment value in the power parameter are configured independently, and the target received power parameter in the power parameters is configured in common;

or, the dynamic power adjustment value in the power parameters is configured independently, and the target received power parameter and the path loss compensation coefficient in the power parameters are configured in common;

or, the dynamic power adjustment value, the target received power parameter, and the path loss compensation coefficient in the power parameters are configured in common.

For related details, refer to the steps performed by the access network device in each of the foregoing method implementations.

Figure 8:
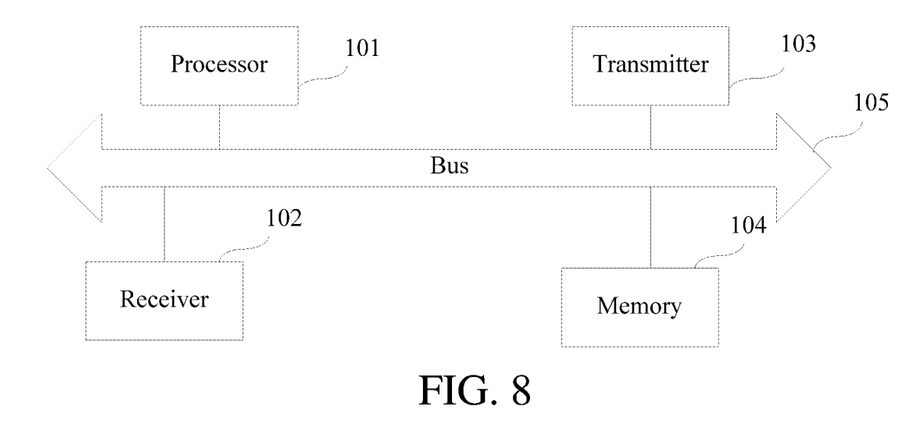
FIG. 8 is a schematic structural diagram of a terminal according to an exemplary implementation of this application.

Referring to FIG. 8, FIG. 8 is a schematic structural diagram of a terminal according to an exemplary implementation of this application, and the terminal includes: a processor 101, a receiver 102, a transmitter 103, a memory 104, and a bus 105.

The processor 101 includes one or more processing cores, and the processor 101 performs various function applications and information processing by running software programs and modules.

The receiver 102 and the transmitter 103 can be implemented as a communications assembly, and the communications assembly can be a communications chip.

The memory 104 is connected to the processor 101 through the bus 105.

The memory 104 can be configured to store at least one instruction, and the processor 101 can be configured to execute the at least one instruction to implement each step performed by the terminal in the foregoing method implementations.

In addition, the memory 104 can be implemented by any type of volatile or non-volatile storage devices or a combination of them, the volatile or non-volatile storage devices include but are not limited to: a disk or a compact disc, an electrically erasable programmable read-only memory (EEPROM), an erasable programmable read-only memory (EPROM), a static random access memory (SRAM), a read-only memory (ROM), a magnetic memory, a flash memory, and a programmable read-only memory (PROM).

Figure 9:
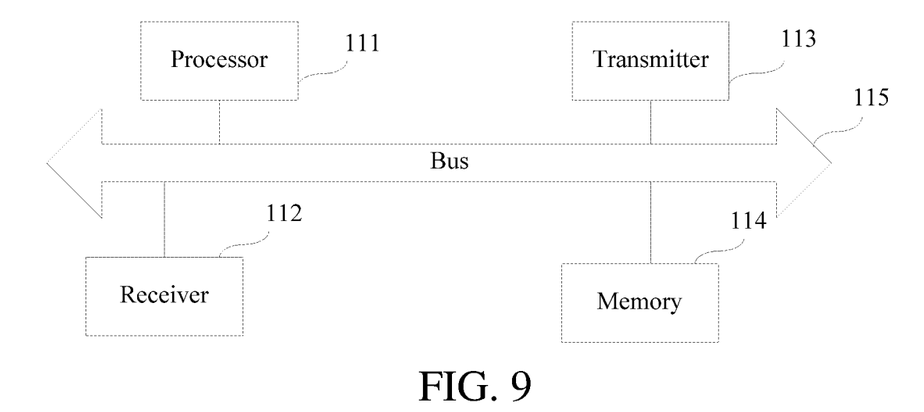
FIG. 9 is a schematic structural diagram of an access network device according to an exemplary implementation of this application.

Referring to FIG. 9, FIG. 9 is a schematic structural diagram of an access network device according to an exemplary implementation of this application, and the access network device includes: a processor 111, a receiver 112, a transmitter 113, a memory 114, and a bus 115.

The processor 111 includes one or more processing cores, and the processor 111 performs various function applications and information processing by running software programs and modules.

The receiver 112 and the transmitter 113 can be implemented as a communications assembly, and the communications assembly can be a communications chip.

The memory 114 is connected to the processor 111 through the bus 115.

The memory 114 can be configured to store at least one instruction, and the processor 111 can be configured to execute the at least one instruction to implement each step performed by the access network device in the foregoing method implementations.

In addition, the memory 114 can be implemented by any type of volatile or non-volatile storage devices or a combination of them, the volatile or non-volatile storage devices include but are not limited to: a disk or a compact disc, an electrically erasable programmable read-only memory (EEPROM), an erasable programmable read-only memory (EPROM), a static random access memory (SRAM), a read-only memory (ROM), a magnetic memory, a flash memory, and a programmable read-only memory (PROM).

This application provides a computer readable storage medium, where the storage medium stores at least one instruction, and the at least one instruction is loaded and executed by a processor to implement the data transmission method according to the foregoing method implementations.

This application further provides a computer program product, where when the computer program product is run on a computer, the computer is enabled to perform the data transmission method according to the foregoing method implementations.

A person skilled in the art should be aware that in the foregoing one or more examples, these functions described in the implementations of this application can be implemented by hardware, software, firmware, or any combination thereof. When implemented by the software, these functions can be stored in a computer readable medium, or be transmitted as one or more instructions or codes on the computer readable medium. The computer readable medium includes a computer storage medium and a communication medium, where the communication medium includes any medium that enables a computer program to be transmitted from one place to another place. The storage medium can be any available medium that can be accessed by a general-purpose or special-purpose computer.

The foregoing descriptions are merely preferred implementations of this application, but are not used to limit this application. Any modification, equivalent replacement, or improvement made without departing from the spirit and principle of this application should fall within the protection scope of this application.

What is claimed is:

1. A data transmission method, performed by a terminal, wherein the terminal is configured with domains that are distinguished through transmission resources, wherein the method comprises:
receiving power parameters, wherein part of the power parameters is configured independently for different domains while the other part of the power parameters is configured in common for different domains;
determining a first power in a first domain according to the power parameters, and transmitting data by a terminal at the first power in the first domain; and
determining a second power in a second domain according to the power parameters, and transmitting data by the terminal at the second power in the second domain.

2. The method according to claim 1, wherein
the first domain and the second domain are distinguished through a frequency domain bandwidth part BWP.

3. The method according to claim 2, wherein
a target received power parameter and a path loss compensation coefficient in the power parameters are configured independently, and a dynamic power adjustment value in the power parameters is configured in common,
or,
the target received power parameter, the path loss compensation coefficient, and the dynamic power adjustment value in the power parameters are configured independently;
or,
the target received power parameter in the power parameters is configured independently, and the path loss compensation coefficient and the dynamic power adjustment value in the power parameters are configured in common.

4. The method according to claim 1, wherein, before the transmitting data by a terminal at the first power in the first domain, the method further comprises:
receiving, by the terminal, domain configuration information transmitted by an access network device, wherein the domain configuration information is used to indicate configurations of the first domain and the second domain.

5. The method according to claim 1, wherein the power parameters at least comprise a target received power parameter, a path loss compensation coefficient, and a dynamic power adjustment value.

6. The method according to claim 1, wherein the first domain and the second domain are distinguished through a time domain resource; or the first domain and the second domain are distinguished through the time domain resource and a frequency domain resource.

7. The method according to claim 6, wherein
a target received power parameter and a path loss compensation coefficient in the power parameters are configured independently, and a dynamic power adjustment value in the power parameters is configured in common,
or,
the target received power parameter in the power parameters is configured independently, and the path loss compensation coefficient and the dynamic power adjustment value in the power parameters are configured in common.

8. A data receiving method, performed by an access network device, wherein the method comprises:
configuring multiple domains that are distinguished through transmission resources for a terminal;
transmitting power parameters, wherein part of the power parameters is configured independently for different domains while the other part of the power parameters is configured in common for different domains;
receiving data sent by the terminal at a first power in a first domain; and
receiving data sent by the terminal at a second power in a second domain.

9. The method according to claim 8, wherein
the first domain and the second domain are distinguished through a frequency domain bandwidth part BWP.

10. The method according to claim 9, wherein
a target received power parameter and a path loss compensation coefficient in the power parameters are configured independently, and a dynamic power adjustment value in the power parameters is configured in common,
or,
the target received power parameter, the path loss compensation coefficient, and the dynamic power adjustment value in the power parameters are configured independently;
or,
the target received power parameter in the power parameters is configured independently, and the path loss compensation coefficient and the dynamic power adjustment value in the power parameters are configured in common.

11. The method according to claim 8, wherein the method further comprises:
transmitting domain configuration information by the access network device to the terminal, wherein the domain configuration information is used to indicate configurations of the first domain and the second domain.

12. The method according to claim 8, wherein the power parameters at least comprise a target received power parameter, a path loss compensation coefficient, and a dynamic power adjustment value.

13. The method according to claim 8, wherein the first domain and the second domain are distinguished through a time domain resource; or the first domain and the second domain are distinguished through the time domain resource and a frequency domain resource.

14. The method according to claim 13, wherein
a target received power parameter and a path loss compensation coefficient in the power parameters are configured independently, and a dynamic power adjustment value in the power parameters is configured in common,
or,
the target received power parameter in the power parameters is configured independently, and the path loss compensation coefficient and the dynamic power adjustment value in the power parameters are configured in common.

15. A data receiving apparatus, wherein the apparatus comprises: a processor, a receiver, a transmitter, a memory, and a bus, the memory stores at least one instruction, and the memory is connected to the processor through the bus, the memory is configured to store at least one instruction, and the processor is configured to implement the at least one instruction to:
configure multiple domains that are distinguished through transmission resources for a terminal;

transmit power parameters, wherein part of the power parameters is configured independently for different domains while the other part of the power parameters is configured in common for different domains;

receive, through the transmitter, data sent by the terminal at a first power in a first domain; and receive, through the transmitter, data sent by the terminal at a second power in a second domain.

16. The apparatus according to claim 15, wherein the first domain and the second domain are distinguished through a frequency domain bandwidth part BWP.

17. The apparatus according to claim 16, wherein a target received power parameter and a path loss compensation coefficient in the power parameters are configured independently, and a dynamic power adjustment value in the power parameters is configured in common, or, the target received power parameter, the path loss compensation coefficient, and the dynamic power adjustment value in the power parameters are configured independently;

or, the target received power parameter in the power parameters is configured independently, and the path loss compensation coefficient and the dynamic power adjustment value in the power parameters are configured in common.

18. The apparatus according to claim 15, wherein the processor is configured to:

transmit domain configuration information to the terminal, wherein the domain configuration information is used to indicate configurations of the first domain and the second domain.

19. The apparatus according to claim 15, wherein the power parameters at least comprise a target received power parameter, a path loss compensation coefficient, and a dynamic power adjustment value.

20. The apparatus according to claim 15, wherein the first domain and the second domain are distinguished through a time domain resource; or the first domain and the second domain are distinguished through the time domain resource and a frequency domain resource.

* * * * *